(12) United States Patent
Robson et al.

(10) Patent No.: US 8,121,100 B2
(45) Date of Patent: Feb. 21, 2012

(54) RADIO RESOURCE ALLOCATION FOR CELLULAR WIRELESS NETWORKS

(75) Inventors: Julius Robson, Paris (FR); David Bevan, Bishops Stortford (GB); Mathieu Boue-Lahorgue, Paris (FR)

(73) Assignee: Rockstar Bidco LP, New York, NY (US)

(*) Notice: Subject to any disclaimer, the term of this patent is extended or adjusted under 35 U.S.C. 154(b) by 1069 days.

(21) Appl. No.: 11/966,632

(22) Filed: Dec. 28, 2007

(65) Prior Publication Data

US 2009/0040972 A1 Feb. 12, 2009

(30) Foreign Application Priority Data

Aug. 10, 2007 (GB) .................................. 0715560.9

(51) Int. Cl.
*H04W 4/04* (2009.01)
*H04W 28/26* (2009.01)
*H04W 48/04* (2009.01)
*H04W 72/00* (2009.01)

(52) U.S. Cl. ........ 370/338; 370/329; 370/343; 455/455; 455/451

(58) Field of Classification Search .................. 370/280, 370/281, 294, 295, 328, 329, 338, 343, 432, 370/436, 480; 455/499, 452.1, 452.2, 436, 455/447, 509, 422.1, 451, 454, 444
See application file for complete search history.

(56) References Cited

U.S. PATENT DOCUMENTS

| | | | |
|---|---|---|---|
| 6,405,048 B1 * | 6/2002 | Haartsen ....................... 455/464 |
| 7,941,144 B2 * | 5/2011 | Nylander et al. .......... 455/435.1 |
| 8,005,076 B2 * | 8/2011 | Gallagher et al. ............. 370/353 |
| 2004/0005897 A1 * | 1/2004 | Tomoe et al. .................. 455/450 |
| 2006/0073833 A1 * | 4/2006 | Hamalainen et al. ......... 455/447 |
| 2007/0097938 A1 * | 5/2007 | Nylander et al. .............. 370/338 |
| 2008/0085720 A1 * | 4/2008 | Hirano et al. .............. 455/452.1 |
| 2008/0130593 A1 * | 6/2008 | Scheinert et al. ............. 370/337 |
| 2008/0188265 A1 * | 8/2008 | Carter et al. .................. 455/561 |
| 2010/0062768 A1 * | 3/2010 | Lindqvist et al. .......... 455/435.1 |
| 2010/0136989 A1 * | 6/2010 | Westerberg et al. .......... 455/450 |

\* cited by examiner

*Primary Examiner* — Chi Pham
*Assistant Examiner* — Ahmed Elallam
(74) *Attorney, Agent, or Firm* — Barnes & Thornburg LLP

(57) ABSTRACT

Embodiments of the invention relate to cellular wireless networks and are particularly suited to networks including different types of base stations. So-called femtocell types of base stations are typically deployed within a subscriber's premises and operate at low transmit power, providing a very limited area of wireless coverage. A femtocell is typically deployed within the area of wireless coverage of a conventional macrocell, occupying the same frequency spectrum and timeslots as the macrocell. A problem can be presented to a user equipment terminal that is close to the femtocell but unable to gain access to it, because the transmissions from the femtocell may appear as interference to the user equipment terminal, preventing it from accessing the macrocell which it could otherwise access. A cellular wireless network according to an embodiment of the invention employs a method of allocating radio resource to femtocells so that the transmissions from femtocells do not occupy the same radio resource blocks as those used by the macrocell for signalling; embodiments of the invention thereby prevent interference associated with signalling to cause a connection to be lost, or prevent a connection being set up.

10 Claims, 9 Drawing Sheets

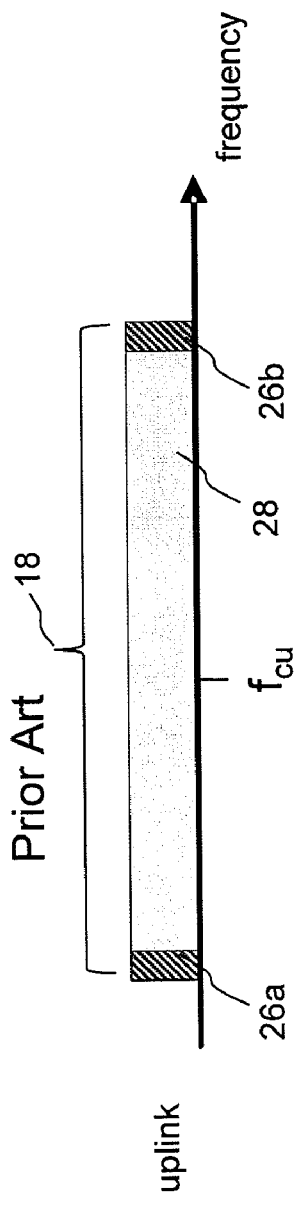
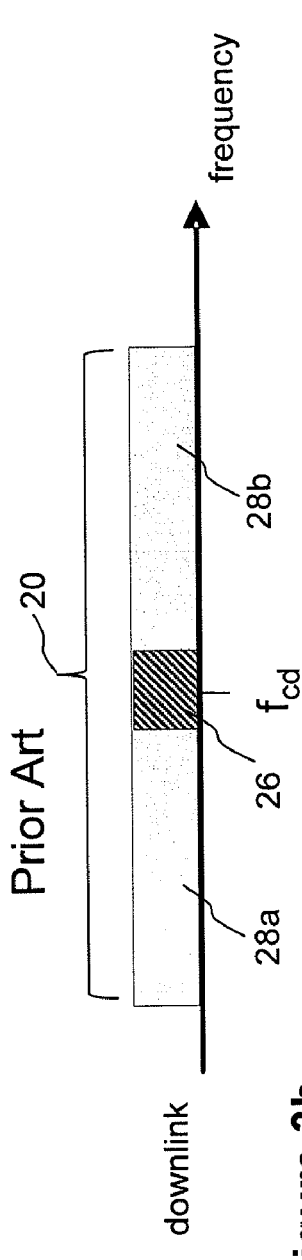
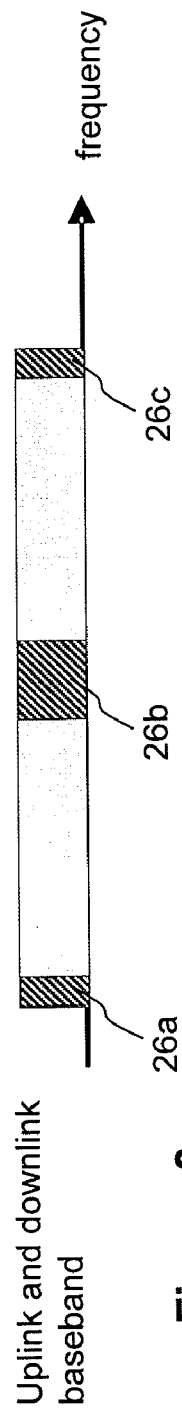
Figure 3a
Figure 3b
Figure 3c

RADIO RESOURCE ALLOCATION FOR CELLULAR WIRELESS NETWORKS

FIELD OF THE INVENTION

The present invention relates generally to cellular wireless data communications networks, and more specifically to method and apparatus relating to a frequency arrangement for base stations such as femtocells.

BACKGROUND OF THE INVENTION

The concept of the home deployed base station, or femtocell, is considered of increasing importance for cellular network operators. Femtocells operate at low downlink transmit power, and are designed to improve the cellular coverage within a home or enterprise environment and their immediate surroundings. Typically a femtocell would be linked into the wider cellular Radio Access Network through a customer's broadband link (e.g. digital subscriber line, cable, passive optical network or other wireline access technology), and provide user equipment terminals with access to data.

The term "base station" is used here to refer to a radio transceiver connected to a telecommunications network; a cell site may have several base stations, each serving a different area of wireless coverage. This deployment of multiple base stations at a cell site is particularly common for macro-cellular networks, whereas typically femtocell base stations are intended to be deployed individually, and accordingly are equipped with an omni-directional antenna. The user equipment terminal, often a mobile device such as a smart phone, Personal Digital Assistant (PDA) or laptop and the like, is alternatively referred to as a "user equipment".

The use of femtocells is particularly applicable in high capacity packet data cellular wireless communication systems such as HSPA ('High Speed Packet Access'), a so-called third generation evolutionary system, and LTE (Long Term Evolution), often referred to as a fourth generation (4G) system. Services using such systems can typically accommodate a variable data rate to and from the user equipment, and can exploit a greater data rate should it be available, for example for the faster transfer of data files. It is accordingly advantageous to maximise the data capacity available to a user, and to this end adaptive modulation and coding is typically employed. The provision of a femtocell within a subscriber's premises can provide a high capacity link within a small local area that will typically also be within the coverage area of a macrocell.

Although generally placed indoors, femtocells operate within an existing conventional cellular wireless network, which is termed a macrocellular network. There may typically be hundreds of femtocells for every macrocell. The large number of femtocells may interfere with the signal from the macrocells, particularly in the downlink direction from the macrocell base station to the user equipment, in some cases preventing access altogether. This problem is accentuated in the case of "closed access" femtocells which can only be used by a limited group of user equipments. User equipments outside the closed access group may receive a strong signal from the femtocell, however as they cannot use it, it acts as interference to signals received from macrocells.

FIG. 1 illustrates the problem of interference in the closed access case. A femtocell base station 12 is in communication with a user equipment 16. Nearby, a second user equipment 14 receives a strong signal from the femtocell 12 but cannot establish a connection with the femtocell, as the femtocell is closed to access by the second user equipment 14. As mentioned above, the signal from the femtocell base station 12 conventionally occupies the same frequency band as is occupied by the macrocell base station 10, so that the signal from the femtocell base station 12 potentially acts as interference with signals received from macrocell base station 10 at a second user equipment 14.

A second problem relating to the provision of a large number of femtocells within the coverage area of a macrocell base station is the expenditure of power by a user equipment when performing measurements for handover decisions: it can be expected that there is a larger number of near neighbours than are present in a conventional macrocell system, and this will trigger a commensurately larger number of handover-related actions on the part of the user equipment than is experienced in macrocell systems. These actions involve processing on the part of the user equipment, which is particularly undesirable given that the battery life of a user equipment, typically a handset, should be maximised.

One known solution to these problems is for femtocells to use a different frequency channel to that used by a macrocell deployed in the same area. Whilst this avoids interference problems, it is undesirable to operators, since spectrum is expensive to acquire.

Another known alternative is to use an interference mitigation technique: femtocells base stations detect the level of interference they are causing to the user equipments served by a macrocell base station operating in the same area, and reduce their power accordingly. However, this will potentially limit the coverage area and data rate available to users of the femtocell.

It is an object of the present invention to provide a method and apparatus which addresses these disadvantages.

SUMMARY OF THE INVENTION

In accordance with a first aspect of the present invention, there is provided a method of allocating radio resources in a radio communications network, the radio communications network comprising a first base station open for access to substantially any user equipment terminal of the radio communications network and a second base station open for access to only a predetermined one or more user equipment terminals of the radio communications network, wherein the first base station is arranged to use a first plurality of radio resource blocks for radio communications with user equipment terminals, and the first plurality includes one or more radio resource blocks useable by the first base station for signalling, the method comprising:

allocating a second plurality of radio resource blocks for use by the second base station in radio communications with user equipment terminals, wherein the first plurality and the second plurality of radio resource blocks have at least one radio resource block in common, and wherein the second plurality of radio resource blocks does not include said one or more radio resource blocks useable by the first base station for signalling.

In embodiments of the invention, a first base station, such as a macrocell base station, is open to access to substantially any user and may operate in all or part of the frequency band used by a second base station, such as a femtocell, this being open for access to only a predetermined one or more user equipment terminals. A user equipment terminal that is denied access to the femtocell base station may be located in close proximity thereto, so that it may receive a stronger signal from the femtocell base station than from the macrocell base station. The signal from the femtocell base station therefore has potential to cause interference at the user equipment terminal, potentially preventing it from communicating with the macrocell base station if interference is experienced with radio resource blocks that are used by the macrocell base station for signalling. Since the femtocell base station is allocated radio resource blocks other than those used for signalling by the macrocell base station, the user equipment terminal can advantageously maintain communication with the macrocell base station.

Radio resource blocks represent allocations of parts of the frequency spectrum within specified timeslots. Preferably the radio resource blocks allocated to the femtocell and macrocell base stations are separated in frequency, with the benefit that transmission at the femtocell and macrocell base stations can be simultaneous, thus simplifying the design as some timing constraints are removed.

Conveniently, the radio resource blocks allocated to the macrocell base station occupy a contiguous frequency range, with the benefit that the available data capacity within a receiver bandwidth is maximised. Similarly, it is beneficial for the radio resource blocks allocated to the macrocell base station to occupy a contiguous frequency range.

Advantageously, the radio resource blocks allocated to the femtocell base station are a subset of the radio resource blocks allocated to the macrocell base station, with the benefit that no additional frequency spectrum is required for the operation of the femtocell base station beyond that allocated for the operation of the macrocell base station.

In a further arrangement the radio communications network includes a further base station, for example of the femtocell type, and thus one which is accessible by only a predetermined one or more user equipment terminals. Preferably radio resource blocks allocated to this further femtocell are not used by either the first femtocell or macrocell for signalling so that interference with signalling by each of the base stations is prevented.

Further features and advantages of the invention will become apparent from the following description of preferred embodiments of the invention, given by way of example only, which is made with reference to the accompanying drawings.

BRIEF DESCRIPTION OF THE DRAWINGS

FIG. 3a is a schematic diagram showing a conventional frequency allocation for an uplink showing critical portions;

FIG. 3b is a schematic diagram showing a conventional frequency allocation for a downlink showing critical portions;

FIG. 3c is a schematic diagram showing a conventional frequency allocation for an uplink and downlink at baseband showing critical portions;

DETAILED DESCRIPTION OF THE INVENTION

A first embodiment of the invention will be described in the context of a cellular wireless communication network comprising macrocell and femtocell base stations, with particular reference to the frequency division duplexed systems. However, it will be understood that this example is for illustration purposes and that the invention can be applied to radio communications generally and to systems complying with other wireless standards. For example, the invention is applicable to radio access systems generally and is applicable to time division duplex systems in addition to frequency division duplexed systems.

Figure 1:
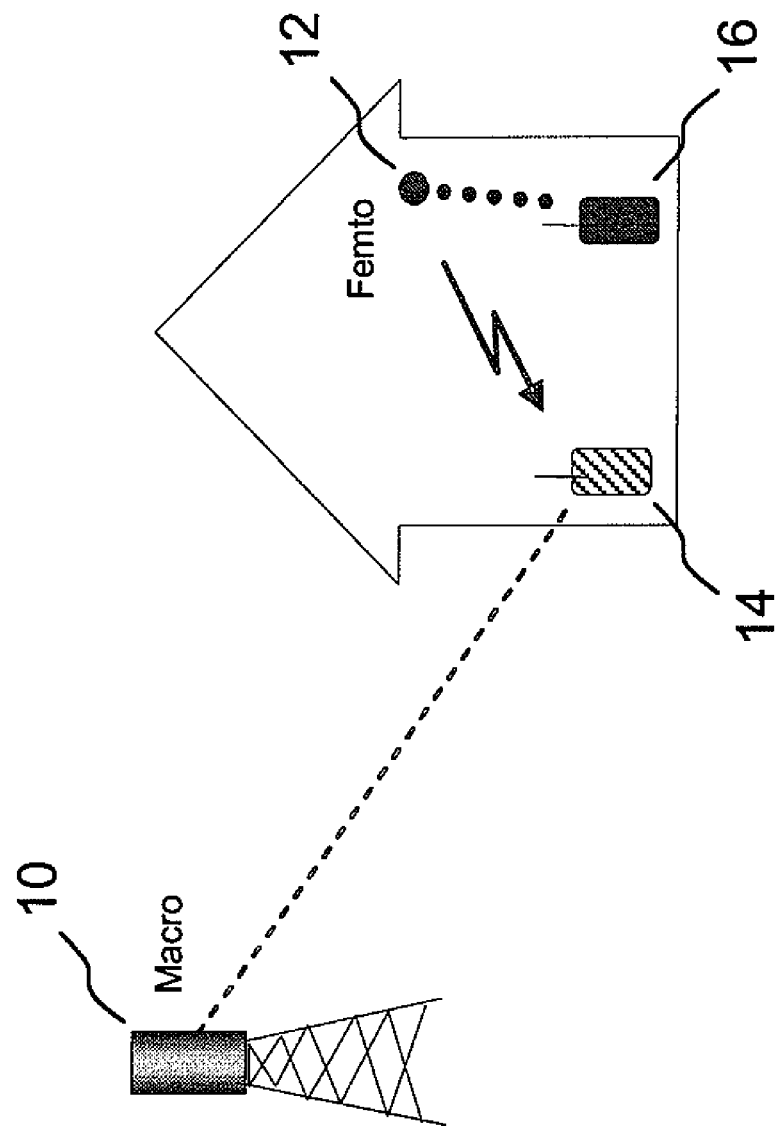
FIG. 1 is a schematic diagram illustrating potential interference from a femtocell base station received at a user equipment communicating with a macrocell base station.
Figure 2:
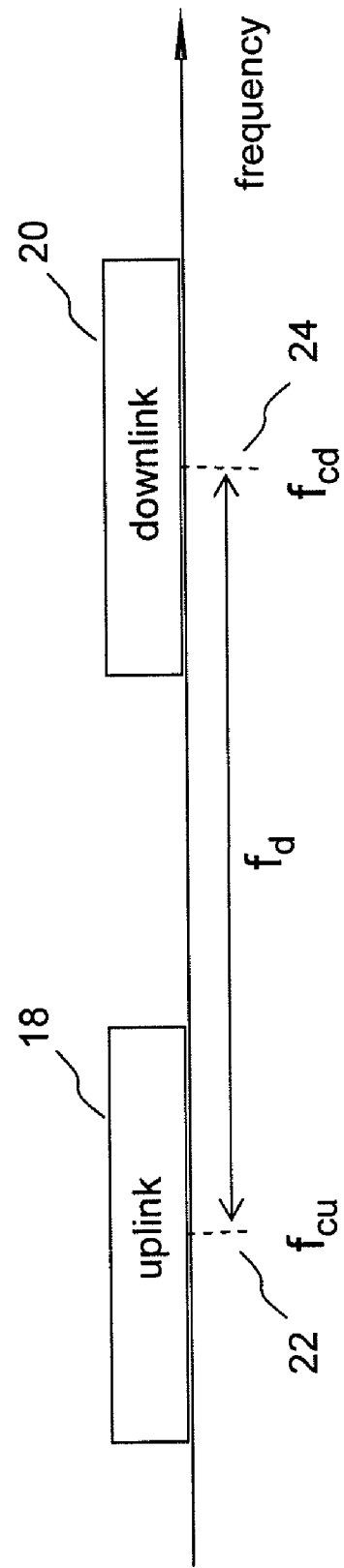
FIG. 2 is a schematic diagram showing a conventional frequency division duplex frequency plan.

FIG. 2 illustrates the frequency plan for a conventional frequency division duplex radio communication system, such as the Third Generation Partnership Project Long Term Evolution System, know as LTE. It can be seen that a block of frequencies 18 with a centre frequency $f_{cu}$ 22 is allocated for use in the uplink, that is the path from a user equipment to a base station, and that a further block of frequencies 20 with a centre frequency $f_{cu}$ 24 is allocated for use in the downlink, that is the path from a base station to a user equipment. The centre frequencies of the uplink and downlink blocks are separated by a frequency difference $f_d$.

FIG. 3a illustrates the conventional resource allocation within the uplink frequency band. Certain frequency blocks are allocated for the communication of signalling information; these blocks 26a and 26b are shown as shaded portions. The remainder of the band 28 is allocated for the communication of payload data. The position of the frequency blocks allocated to signalling in the uplink and the downlink are shown is an example only; the position within the band may differ. Also, it should be noted that data may be carried in addition in the frequency blocks allocated for signalling in both the uplink and the downlink.

FIG. 3b illustrates the conventional resource allocation within the downlink frequency band. Frequency block 26 is allocated for the communication of signalling information and the remainder of the band 28a, 28b is allocated for the communication of payload data. Note that in this example, the frequency blocks allocated in the uplink and downlink for signalling occupy different parts of the spectrum, relative to the centre frequency.

FIG. 3c shows the uplink and downlink frequency allocations overlaid for comparison; in this case the frequency allocations are referred to baseband, that is to say the centre frequency is translated to zero. It can be seen that the parts 26a, 26b and 26c of the spectrum allocated to signalling on either the uplink or the downlink occupy regions at either end and the centre of the spectrum.

Figure 4:
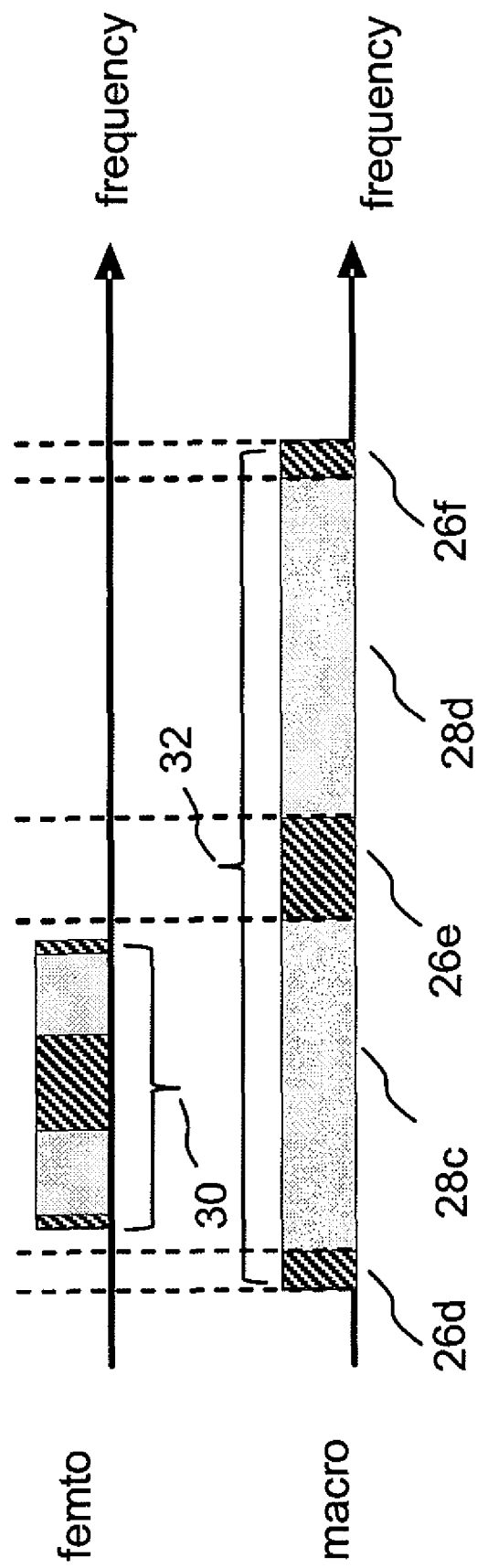
FIG. 4 is a schematic diagram showing a frequency allocation for a femtocell relative to the frequency allocation to a macrocell according to an embodiment of the invention.

FIG. 4 illustrates a frequency arrangement according to an embodiment of the invention. It can be seen that a frequency band 30 is allocated for use by a femtocell and that this band 30 does not overlap the regions 26d, 26e and 26f used for signalling in the macrocell spectrum 32. The frequency allocation to the femtocell is preferably a contiguous region, as shown in FIG. 4; whilst this is beneficial in terms of reducing the requirements on receiver bandwidth at the femtocell, the allocation could be distributed in any manner across the spectrum 32, provide that there is no overlap between the frequency band 30 utilised by the femtocell and signalling frequencies 26d, 26e, 26f. The frequency allocation illustrated in FIG. 4 shows the uplink and downlink bands overlaid at baseband; the translation to radio frequency will be performed in such a way that the relationship between femtocell and macrocell bands is maintained as illustrated.

The factors determining frequency allocation according to embodiments of the invention will now be described. In general, interference with data messages can generally be tolerated because transmissions can occur despite the interference, whereas interference with signalling messages may result in a dropped connection or the inability to establish a connection to a base station at all. It is therefore preferable to avoid interference with signalling messages when designing frequency allocation schemes.

As stated above, interference with data messages can be tolerated because mitigation techniques such as error correction coding, or resending of corrupted data, can be employed to ensure that the message is successfully received. In addition, provided parts of the band do not contain interference, these can be used to transport data. There is also an efficient technique available known as hybrid ARQ (automatic resend request) that can mitigate the effects of corruption of data. In many cases, a reduced data rate may be tolerated by a user, or additional timeslots may be allocated to the user to compensate for the poorer received signal quality. Furthermore, retransmissions of the data to the user equipment may be scheduled so as to select a portion of the spectrum unaffected by the interference due to the femtocell.

Turning now to signalling messages, such messages may comprise broadcast messages allocating radio resource and enabling synchronisation, as is known in the art. These messages are typically transmitted on the downlink and affect operation of the links in both directions. Furthermore the messages cannot generally be reallocated to other parts of the band in the event that received signals experience interference. It is thus beneficial to position the femtocell frequency allocation in parts of the band that do not correspond with the signalling frequencies of the macrocell downlink, to avoid interference from nearby femtocells. The frequency allocation to the femtocell also optionally avoids the portions of the uplink frequency allocation that contain signalling information.

Figure 5:
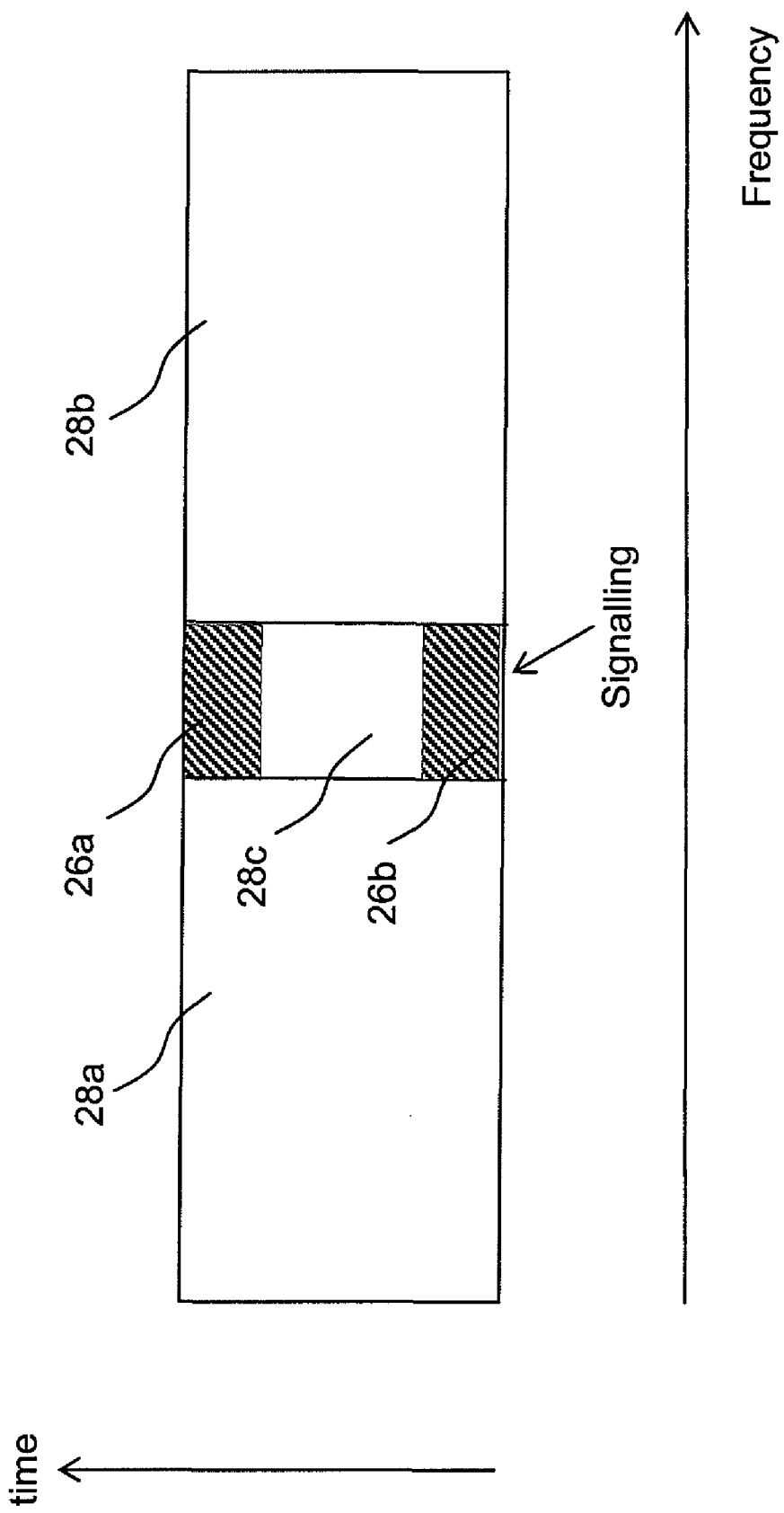
FIG. 5 is a schematic diagram showing a first example of a radio resource block allocation according to an embodiment of the invention.

FIG. 5 illustrates the radio resource allocation in the downlink in terms of both frequency and time. It can be seen that in the frequency band allocated for signalling, only the radio resource blocks indicated by the reference numerals 26a, 26b are actually allocated to signalling, and that this signalling region is shared by at least one block 28c for the carriage of data. As a result it can be seen that only certain timeslots of the frequency spectrum nominally allocated to signalling are used for signalling. This arrangement represents a more complex allocation of radio resources than is associated with conventional arrangements, since resources are allocated in time in addition to being allocated in frequency. As a result femtocells can occupy radio resource blocks that are not used by the macrocell for frequency. Analogous regions in the radio resource blocks that are allocated to the uplink can also be allocated to a femtocell while avoiding the parts of the radio resource used by the macrocell for signalling.

Figure 6:
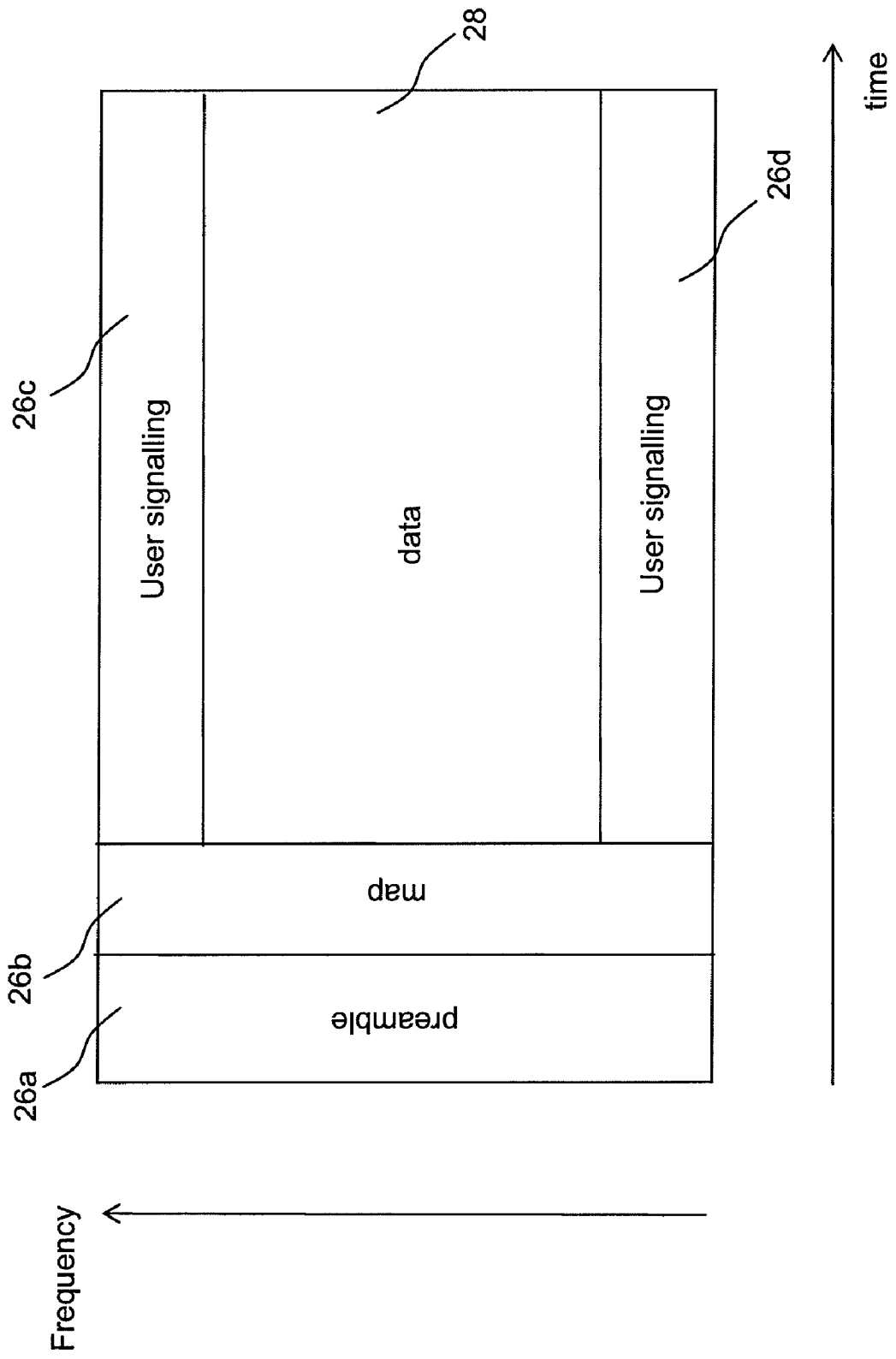
FIG. 6 is a schematic diagram showing a second example of a radio resource block allocation according to an embodiment of the invention.
Figure 7:
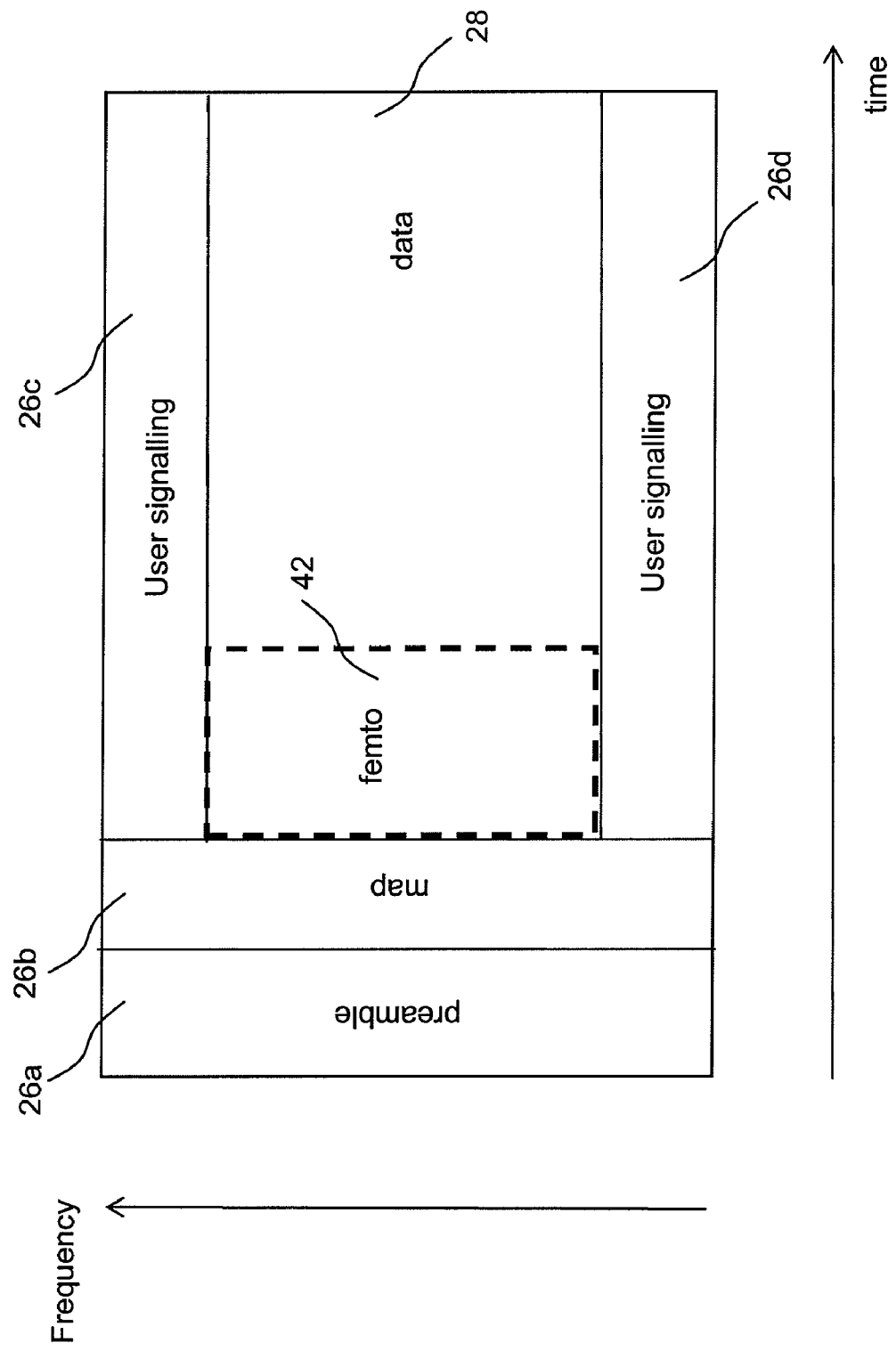
FIG. 7 is a schematic diagram showing radio resource block allocation to a macrocell and a femtocell according to an embodiment of the invention.

FIG. 6 shows an alternative allocation of macrocell radio resource blocks to that shown in FIG. 5; the regions shown are illustrative only and the position may vary between implementations. It can be seen that regions 26a, 26b, 26c, 26d carrying signalling occupy potentially all of the frequency allocation at some point in time, meaning that an implementation in which interference with signalling is avoided by frequency allocation alone is thus not feasible, and as a result an allocation of radio resource blocks to femtocells in both frequency and time is required. Turning to FIG. 7, such an allocated region is indicated by part 42. An allocation such as this may be particularly applicable to some implementations of the IEE802.16 WiMax systems.

Figure 8:
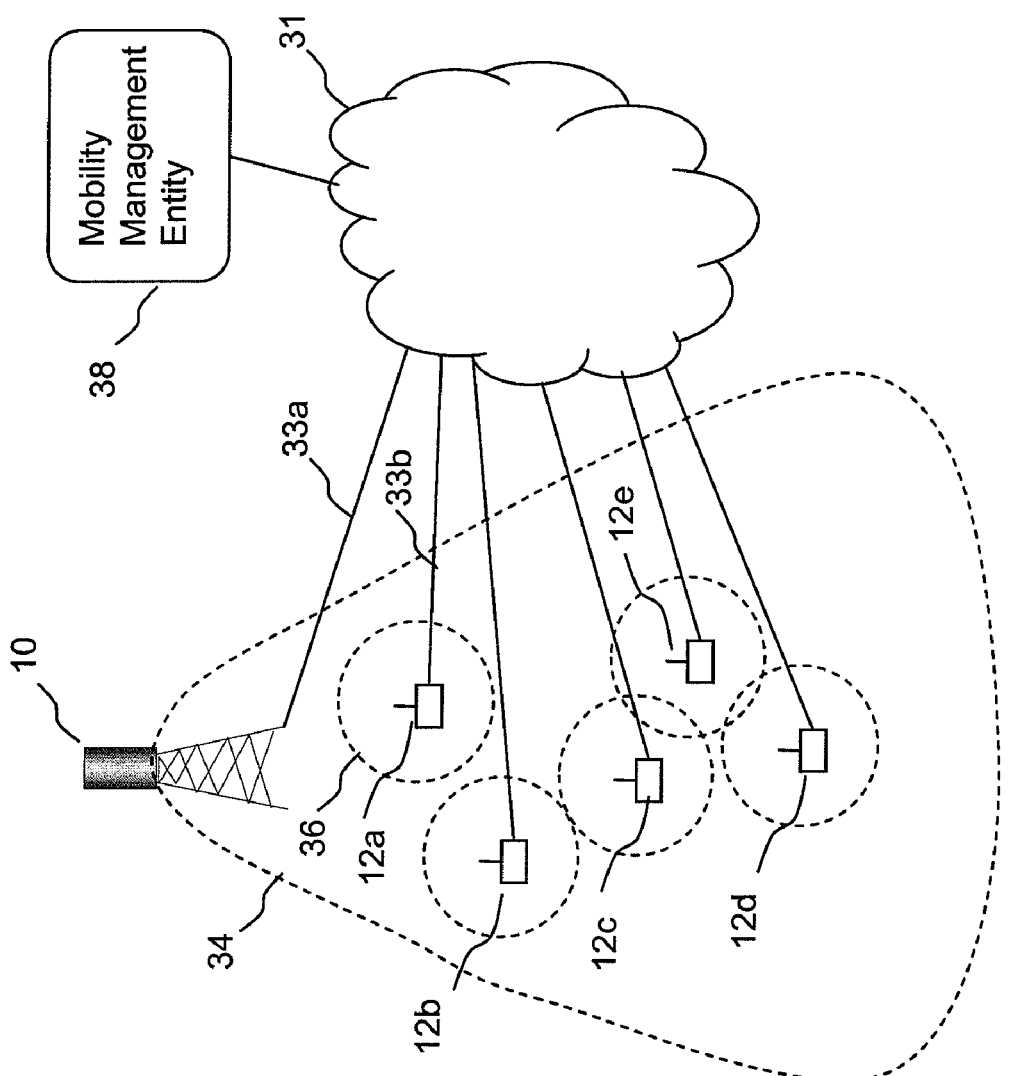
FIG. 8 is a schematic diagram showing the coverage area of a macrocell and five femtocells configured according to an embodiment of the invention.

FIG. 8 shows a situation in which many femtocells 12a . . . 12e are deployed in the area of wireless cellular coverage 34 of a macrocell base station 10. The areas of wireless cellular coverage 36 of one of the femtocells 12a is shown, and equivalent areas of wireless cellular coverage are shown for the other femtocells in the illustration. It can be seen that there is potential for interference between femtocells, especially in the case of femtocells indicated by reference numerals 12c, 12d and 12e.

The femtocells 12a . . . 12e and macrocell 10 are in potential communication through the backhaul links 33a . . . 33e to a telecommunications network 31 and to a mobility management entity 38. The mobility management entity 38 may in an example of an implementation manage the radio resource allocation to the femtocells as described in this embodiment. This may involve allocating femtocells different radio resource blocks from those allocated to their neighbours to reduce the probability of interference between femtocells.

Figure 9:
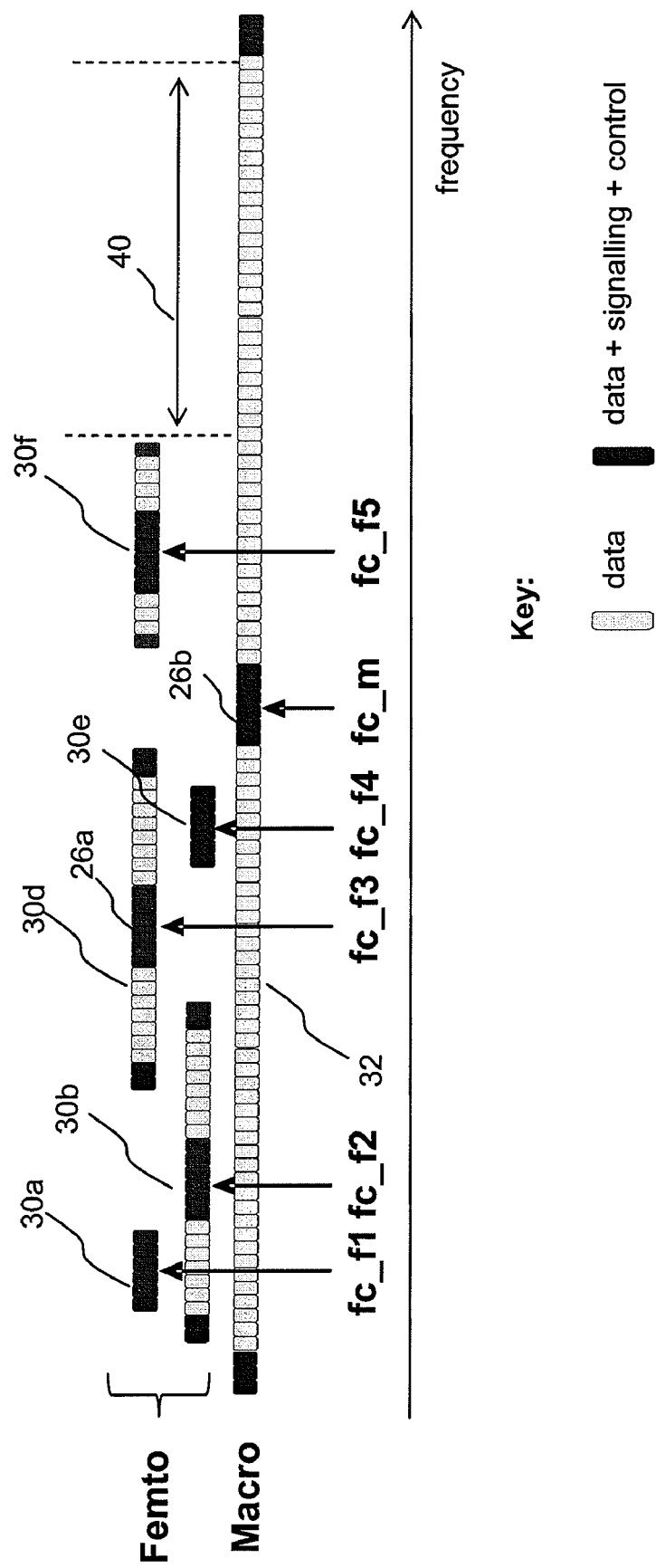
FIG. 9 is a schematic diagram showing a frequency allocation to a macrocell and five femtocells configured according to an embodiment of the invention.

FIG. 9 illustrates an example of an allocation of frequency bands 30a . . . 30f to multiple femtocells 12a . . . 12f operating in the area of wireless coverage of a macrocell 10 occupying a frequency band indicated by the reference numeral 32. Preferably a frequency allocation is made to femtocells that does not overlap between femtocells. If this is not possible, then at least the parts of the femtocell allocations used for signalling should not overlap with the equivalent parts allocated to other adjacent femtocells.

Preferably at least part 40 of the portion of the macrocell frequency spectrum that is allocated to payload data is protected from also being allocated to femtocells, so that the macrocell retains a reasonable data capacity when experiencing interference from femtocells.

It can be seen that the centre frequencies fc_f1, fc_f2, fc_f3, fc_f4, fc_f5 allocated to femtocells differ between respective femtocells. Since the algorithms controlling handover operate in such a way that handover of a user equipment between base stations with different centre frequencies are controlled by default by the network controller rather than locally at the user equipment, this has the advantage of enabling such handover operations to be inhibited if necessary by a network controller. As a result the network controller can prevent a user equipment terminal making unnecessarily frequent handover measurements that would otherwise consume power and reduce battery life.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of allocating radio resources in a radio communications network, the radio communications network comprising a first base station open for access to substantially any user equipment terminal of the radio communications network and a second base station open for access to only a predetermined one or more user equipment terminals of the radio communications network, wherein the first base station is arranged to use a first plurality of radio resource blocks for radio communications with user equipment terminals, and the first plurality includes one or more radio resource blocks useable by the first base station for signalling, the method comprising:

allocating a second plurality of radio resource blocks for use by the second base station in radio communications with user equipment terminals, wherein the first plurality and the second plurality of radio resource blocks have at least one radio resource block in common, and wherein the second plurality of radio resource blocks does not include said one or more radio resource blocks useable by the first base station for signalling.

2. A method according to claim 1, wherein each respective radio resource block is associated with a different frequency.

3. A method according to claim 2, wherein the first plurality of radio resource blocks occupies a contiguous frequency range.

4. A method according to claim 2, wherein the second plurality of radio resource blocks occupies a contiguous frequency range.

5. A method according to claim 1, wherein the second plurality of radio resource blocks is a subset of the first plurality of radio resource blocks.

6. A method according to claim 1, wherein the one or more of said radio resource blocks useable by the first base station for signalling include radio channels for synchronization, broadcast and for transmitting control signalling.

7. A method according to claim 1, wherein the radio communications network comprises a further base station open for access to only a predetermined one or more user equipment terminals, the method further comprising allocating a further plurality of radio resource blocks for use by the further base station for radio communications with user equipment terminals, wherein the first and further pluralities of radio resources share at least one radio resource block, wherein the further plurality of radio resources excludes said one or more of said radio resource blocks useable by the first base station for signalling, and wherein the second plurality of radio resource blocks and the further plurality of radio resource blocks includes one or more radio resource blocks different than those useable by the second and further base stations respectively for signalling.

8. A node of a radio communication network arranged to allocate radio resources in a radio communication network, the radio communications network comprising a first base station open for access to substantially any user equipment terminal supported by the radio communications network and a second base station open for access to only a predetermined one or more user equipment terminals of the radio communications network, wherein the first base station is arranged to use a first plurality of radio resource blocks for radio communications with user equipment terminals, and the first plurality includes one or more radio resource blocks useable by the first base station for signalling, the node being arranged to:

allocate a second plurality of radio resource blocks for use by the second base station in radio communications with said predetermined one or more user equipment terminals, wherein the first plurality and second plurality of radio resources blocks have at least one radio resource block in common, and wherein the second plurality of radio resources blocks does not contain said one or more of said radio resource blocks useable by the further base station for signalling.

9. A base station of a radio communications network, the base station being open for access to substantially any user equipment terminal of the radio communications network, the radio communications network further comprising a further base station, arranged to be open for access to only a predetermined one or more user equipment terminals, said base station being arranged to use a first plurality of radio resource blocks for radio communications with user equipment terminals, the first plurality of radio resource blocks including one or more radio resource blocks useable by said base station for signalling, said base station being arranged to:

allocate a second plurality of radio resource blocks for use by the further base station for radio communications with said predetermined one or more user equipment terminals, wherein the first plurality and second plurality of radio resource blocks share at least one radio resource block, and wherein the second plurality of radio resource blocks does not contain said one or more of said radio resource blocks useable by said base station for signalling.

10. A base station of a radio communications network, the base station being arranged to be open for access to only a predetermined one or more user equipment terminals, the radio communications network further comprising a further base station arranged to be open for access to substantially any user equipment terminal of the radio communications network, and being arranged to use a first plurality of radio resource blocks for radio communications with user equipment terminals, the first plurality of radio resource blocks including one or more radio resource blocks useable by the further base station for signalling, wherein said base station is arranged to:

allocate a second plurality of radio resource blocks for use by said base station for radio communications with said predetermined one or more user equipment terminals, wherein the first plurality and second plurality of radio resource blocks share at least one radio resource block, and wherein the second plurality of radio resource blocks does not contain said one or more of said radio resource blocks useable by the further base station for signalling.

* * * * *